Figure 1:
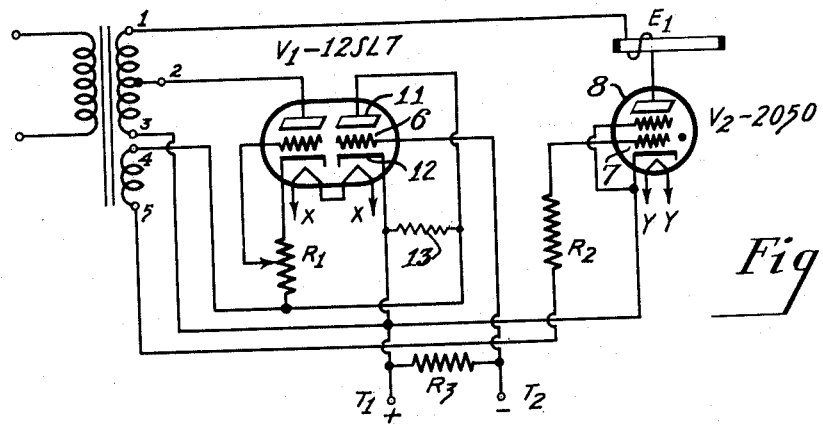

Oct. 11, 1949.   S. V. HART   2,484,342
RELAY CONTROL CIRCUITS
Filed Sept. 29, 1945

INVENTOR
Stephen V. Hart
BY
ATTORNEY

Patented Oct. 11, 1949

2,484,342

UNITED STATES PATENT OFFICE 2,484,342

RELAY CONTROL CIRCUITS

Stephen V. Hart, Indianapolis, Ind., assignor to Radio Corporation of America, a corporation of Delaware Application September 29, 1945, Serial No. 619,402

5 Claims. (Cl. 175—320)

This invention relates to relay control circuits such as are useful in the protection of railroad cross-overs, and has for its principal object the provision of an improved apparatus and method of operation whereby a relay is operated (1) to indicate the presence of a vehicle on a railroad cross-over or (2) to indicate the development of defects in the control apparatus or in the cross-over tracks.

In accordance with the invention, a predetermined difference in potential is maintained between the tracks of the railroad cross-over under normal conditions and variation from this normal potential is utilized to operate a relay for indicating an abnormal condition at the cross-over.

The control apparatus includes a gaseous conduction device having an output circuit which includes the relay to be operated and an input circuit to which are applied component voltages balanced one against the other to make the gaseous conduction device conductive when the potential difference between the rails of the cross-over is normal.

One of these component voltages is derived from any suitable source such as a conventional alternating current supply line. The other of these component voltages is derived from the output circuit of an electron discharge device provided with an input circuit which is connected to the rails of the cross-over or has its potential controlled in accordance with the potential or impedance between these rails. When this potential or impedance varies from normal, the component voltages in the input circuit of the gaseous conduction device are unbalanced and the relay is operated.

An important object of the invention is to provide a relay control circuit which functions to indicate a departure from the value of a voltage or an impedance normally maintained between two conductors. A further object is to provide a relay control circuit which automatically indicates any defects which it develops.

The invention will be better understood from the following description considered in connection with the accompanying drawings and its scope is indicated by the appended claims.

Figure 2:
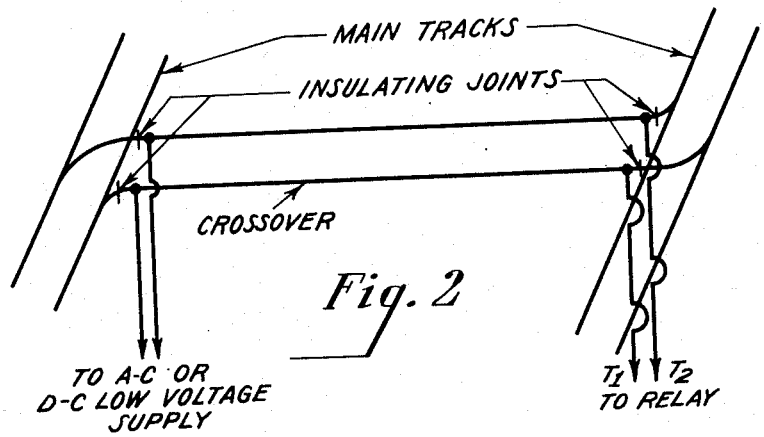
Figure 3:
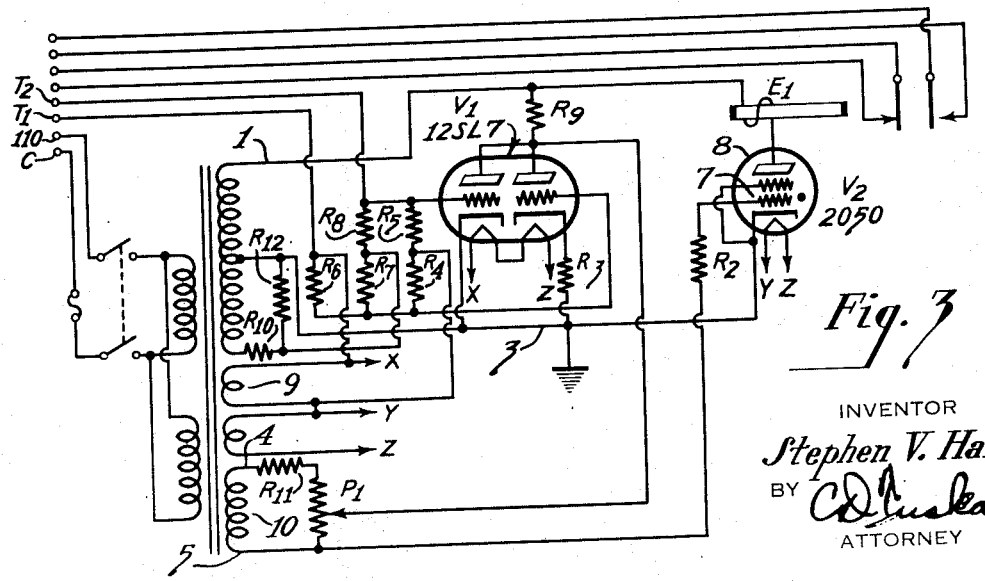

Referring to the drawings:

Figure 1 is a wiring diagram of one modification of the invention which responds directly to the potential between the cross-over rails, Fig. 2 is an explanatory diagram relating to certain features of the railroad cross-over, and Fig. 3 is a wiring diagram of another modification of the invention wherein the cross-over potential is applied to a bridge network interposed between the cross-over and the inputs of a pair of electron discharge devices so as to operate the relay in response to change in the impedance of the cross-over.

The circuit of Fig. 1 includes energizing means shown as a transformer provided with one secondary winding having terminals 1—2—3 and with another secondary winding having terminals 4—5.

From the terminals 1—3 is derived plate potential for a gaseous conduction device 8 which has connected in its plate circuit a relay $E_1$. From the terminals 2—3 is derived plate potential for two electron discharge elements which are shown as opposite halves of a duotriode and have their plate circuits connected between the terminals 2—3 in series with one another. The left hand element functions as an adjustable impedance in the plate circuit of the right hand element. Grid potential is applied to the left hand element from a cathode lead resistor $R_1$ and to the right element from a resistor $R_3$ shown as connected between the tracks or rails $T_1$—$T_2$ of a railroad cross-over. Under these conditions, there is applied to the grid 6 a bias potential which (1) has a predetermined negative value when the cross-over conditions are normal and (2) becomes less negative when the crossover rails are short circuited or develop a broken lead. The anode-to-cathode voltage of the triode 12—11—6 is, of course, dependent on the bias potential applied to the grid 6, being high when such bias potential is most negative and decreasing as such bias potential becomes less negative and more current is conducted by the triode 12—11—6. The polarities of the transformer secondary windings are such that the potential of the winding 4—5 is opposed to the cathode-to-anode potential of the triode 12—11—6 when the polarity of its anode 4 is positive.

Potential is applied to the control grid 7 of the device 8 from the terminal 3 through the triode 12—11—6, the secondary winding 4—5 and a resistor $R_2$. Under these conditions, there is applied to the grid 7 the resultant of two component voltages one of which is determined by the plate-to-cathode voltage of the triode 12—11—6 and the other of which is derived from the secondary terminals 4—5. So long as the potential difference between the rails $T_1$ and $T_2$ is at its normal value, these two component voltages are so related that the device 8 conducts current and the relay $E_1$ is energized. When the potential between the rails $T_1$—$T_2$ changes, however, the duotriode conducts more current, its plate-to-cathode voltage decreases and the device 8 is rendered non-conductive thereby de-energizing the relay $E_1$ due to the fact that the positive component of the bias voltage applied to the grid 7 from the triode 12—11—6 is decreased. In order to facilitate the leakage of electrons from the grid 7, a resistor 13 may be connected across the plate circuit of the triode 12—11—6. This action results either when a vehicle enters the cross-over or in case of a broken lead to one of the rails.

The various parts of Fig. 2 are indicated by explanatory legends and are self-explanatory. The points $T_1$—$T_2$ of Fig. 2 of course are connected to the points $T_1$—$T_2$ of Fig. 1. The relay $E_1$ may be located at any suitable point along one of the main tracks.

The relay control circuit of Fig. 3 differs from that of Fig. 1 in that the control grid potential of the gaseous conduction device 8 is controlled by the impedance of the cross-over. To this end there is provided a bridge circuit the four arms of which consist of resistors $R_4$, $R_5$ and $R_6$ and the cross-over impedance $T_1$—$T_2$. To the terminals X—Y of this bridge is applied a potential derived from a secondary winding 9. Connected across the bridge are resistors $R_7$ and $R_8$.

The opposite diagonals of the bridge are connected respectively to the right hand and left hand grids of the duotriode, the circuits of these grids being completed through a bias resistor $R_{12}$ and the resistor $R_7$ or $R_8$.

Potential is applied to the grid 7 of the gaseous conduction device 8 through the resistor $R_2$ a potentiometer $P_1$ energized from a secondary winding of the transformer and the plate circuits of the duotriode.

The component voltages provided respectively by the potentiometer $P_1$ and by the plate circuits of the duotriode are so related to one another that the device 8 conducts when the impedance of the cross-over $T_1$—$T_2$ is normal and becomes non-conductive in response to any departure from the normal value of the change-over impedance.

The invention is thus characterized by a relay which is energized in response to either normal potential or normal impedance between two conductors and is de-energized in response to either abnormal voltage or abnormal impedance between such conductors.

I claim as my invention:

1. A relay control circuit including conductors normally maintained at a predetermined potential difference with respect to one another, a gaseous conduction device provided with an input circuit and with an output circuit including a relay to be controlled, a pair of electron discharge elements having their plate circuits connected in series and provided with input and output circuits, means connecting the input circuit of one of said elements to said conductors, and means including the output circuit of said electron discharge element for applying to the input circuit of said gaseous conduction device component potentials which have a predetermined resultant in response to normal potentials between said conductors and have a different resultant in response to other than normal potential between said conductors.

2. The combination of a pair of conductors normally maintained at a predetermined potential with respect to one another, a gaseous conduction device having input and output terminals, first and second alternating current supply means, a relay connected to said first alternating current supply means through said output terminals, unilaterally conductive means, an electron discharge device having its anode and cathode connected to said first alternating current supply means through said unilaterally conductive means and having its control grid and cathode each connected to a different one of said conductors, and means interconnecting the input terminals of said gaseous conduction device through the second of said alternating current supply means and the anode and cathode of said electron discharge whereby said relay is deenergized in response to an abnormal potential between said conductors.

3. A relay control circuit including conductors normally maintained at a predetermined potential difference with respect to one another, a gaseous conduction device provided with an input circuit and with an output circuit including a relay to be controlled, an electron discharge element having input and output circuits, means providing a unilaterally conductive and adjustable impedance in the output circuit of said electron discharge device, means connecting the input circuit of said electron discharge device to said conductors, and means responsive to the impedance of said electron discharge device for applying potential to the input circuit of said gaseous conduction device.

4. A relay control circuit including conductors normally maintained at a predetermined potential difference with respect to one another, a gaseous conduction device provided with an input circuit and with an output circuit including a relay to be controlled, an electron discharge element having input and output circuits, means providing a unilaterally conductive and adjustable impedance in the output circuit of said electron discharge device, means connecting the input circuit of said electron discharge device to said conductors, means for applying a first alternating potential through said adjustable impedance means to the output circuit of said electron discharge device, means for applying a second alternating potential having a polarity opposed to that of said first alternating potential, means interconnecting the cathodes of said electron discharge and gaseous conduction devices, and means connecting the anode of said electron discharge device through said second alternating supply means to the input circuit of said gaseous conduction device.

5. A relay circuit including conductors normally maintained at a predetermined potential difference with respect to one another, first and second electron discharge devices each including an input circuit and an output circuit, means providing a unilaterally conductive and adjustable impedance in the output circuit of said first device, a relay to be operated connected in the output circuit of the second of said devices, means connecting the input circuit of said first device to said conductors, means for applying a first alternating potential through said adjustable impedance means to the output circuit of said first device, means for applying a second alternating potential of a polarity different from that of said first alternating potential, means interconnecting the cathodes of said devices, and means connecting the anode of said first device through said second alternating potential applying means to the input circuit of said second device.

STEPHEN V. HART.

REFERENCES CITED

The following references are of record in the file of this patent:

UNITED STATES PATENTS

| Number | Name | Date |
| --- | --- | --- |
| 1,450,749 | Pierce | Apr. 3, 1923 |
| 2,383,600 | Grosdoff | Aug. 28, 1945 |